United States Patent

Noh et al.

Patent Number: 5,455,083
Date of Patent: Oct. 3, 1995

[54] LIQUID CRYSTAL OPTICAL SHUTTER

[75] Inventors: Chang H. Noh, Suwon, Rep. of Korea; T. Asada, Kyoto, Japan

[73] Assignee: Samsung Electron Devices Co., Ltd., Kyunggi, Rep. of Korea

[21] Appl. No.: 266,041

[22] Filed: Jun. 27, 1994

[30] Foreign Application Priority Data

Jun. 28, 1993 [KR] Rep. of Korea .................. 93-11813

[51] Int. Cl.$^6$ ............................................ B32B 27/40
[52] U.S. Cl. ............................... 428/1; 359/36; 359/62
[58] Field of Search .............................. 428/1; 359/36, 359/62

Primary Examiner—Alexander S. Thomas
Attorney, Agent, or Firm—Saliwanchik & Saliwanchik

[57] ABSTRACT

A liquid crystal optical shutter is disclosed.

The liquid crystal optical shutter comprises two sheets of transparent, conductive substrates; a light-adjusting layer supported between the sheets, which comprises a transparent, thin film of polymer prepared by photopolymerizing prepolymers containing approximately 20 to approximately 60% by weight of urethaneacrylate; and a liquid crystal component selected from the group consisting of a cholesteric liquid crystal, a chiral smectic liquid crystal and the mixture thereof, said liquid crystal being encapsulated within said thin film.

Superior in operating voltage, transmissivity and response time, the liquid crystal optical shutter is characterized by specifying a concentration range of the nematic liquid crystal, the base liquid crystal and introducing a flexible polytetramethylene chain with intermediate sizes into the polymer. The specific range and introduction allow the liquid crystal optical shutter to be operated at low voltages without delayed response time and have improved impact resistance. The liquid crystal optical shutter is operable at relatively low voltages of 3 to 12 V with $t_r+t_d$ of 8 to 16 ms and a maximum contrast ratio of at least 120:1.

5 Claims, No Drawings

LIQUID CRYSTAL OPTICAL SHUTTER

FIELD OF THE INVENTION

The present invention relates, in general, to a liquid crystal optical shutter consisting of two sheets of transparent conductive substrates and a light-adjusting layer supported therebetween and, more particularly, to improvements in operating voltage, light transmissivity and response time along with the liquid crystal optical shutter.

BACKGROUND OF THE INVENTION

As a liquid crystal optical shutter, there has conventionally been used nematic liquid crystals, such as twisted nematic liquid crystals and super twisted nematic liquid crystals. These nematic liquid crystals, however, require a polarizer. Several troublesome problems are associated with the use of a polarizer. For example, optical transmissivity is poor, and viewing angles are narrow. Further, the thickness of a nematic liquid crystal cell must be controlled to a highly precise degree, which imposes great difficulty to the enlargement of the area of a liquid crystal cell.

In the few last years, research and development efforts have been directed to overcoming these problems and to liquid crystal/polymer composite systems, the so-called polymer-dispersed type, which are optical shutter devices capable of providing large liquid crystal displays with low optical loss and low cost production.

Most of the optical shutter devices of liquid crystal/polymer composite systems developed so far employ nematic liquid crystals. In this connection, there are two main types of liquid crystal/polymer composite based on their morphology. One type is a structure of dispersed droplets of liquid crystal in a polymeric matrix, being referred to as polymer dispersed liquid crystal (PDLC) (see J.W. Doane, N. A. Vez, B. G. Wu, S. Zumer [1986] *Appl. Phys. Lett.* 48:27). The other type is a structure of three-dimensional networks or microdroplets of polymer in a continuous phase of liquid crystal. This second type is referred to as polymer network liquid crystal (PNLC). This is described in Japanese Patent Laid-Open Publication Nos. Heisei 2-28284 and Heisei 2-55318.

However, liquid crystal/polymer composite optical shutter devices based on the nematic liquid crystals are considerably slow in response times and demand relatively high voltages for operation, compared with other optical shutter devices.

An attempt was made not only to enhance response time but also to improve contrast ratio in the liquid crystal optical shutter of the polymer-dispersed type, by using chiral nematic liquid crystals containing 5 to 10% by weight of chiral dopant and giving helical twisting power to the liquid crystals (see H. Fujitake et al. [1990] NHK Kiken, The 16th Discussion for Liquid Crystal, pamphlet, p120). According to this described method, significant improvement in response time can be effected. However, the voltage necessary to the operation becomes high, which leaves problems to be solved for its practical use.

Another attempt was made to lower the operating voltage without the delay of response time, by using a small quantity of a mixture of two different chiral dopants and lowering the concentration of the polymer (see P. Jiang and T. Asada [1992] *Mol. Cryst. Liq. Cryst.* 222:87). In this case, the optical transmissivity, however, reaches only 70% at an applied voltage of 6 V. Also, the use of polymethylmethacrylate, a polymer showing a glass phase at room temperature, causes the optical shutter to be vulnerable to impact. Accordingly, many problems remain.

BRIEF SUMMARY OF THE INVENTION

The present inventors have recognized that there exists a need for a novel liquid crystal optical shutter free of the aforementioned problems and that is superior in electrical and mechanical properties.

Therefore, it is an object of the present invention to provide a liquid crystal optical shutter capable of being operated at low voltages.

It is another object of the present invention to provide a liquid crystal optical shutter capable of maintaining high contrast ratios.

It is a further object of the present invention to provide a liquid crystal optical shutter capable of responding at high speeds.

It is still another object of the present invention to enlarge the area of liquid crystal cell with the liquid crystal optical shutter.

It is still a further object of the present invention to provide a liquid crystal optical shutter free of a polarization screen.

It is yet another object of the present invention to provide a liquid crystal optical shutter superior in impact resistance.

In accordance with the present invention, the above objectives can be accomplished by providing a liquid crystal optical shutter, comprising two sheets of transparent, conductive substrates; a light-adjusting layer supported between the sheets, which comprises a transparent, thin film of polymer prepared by photopolymerizing prepolymers containing approximately 20 to approximately 60% by weight of urethaneacrylate, and a liquid crystal component selected from the group consisting of a cholesteric liquid crystal, a chiral smectic liquid crystal and the mixture thereof, said liquid crystal being encapsulated with said thin film.

These and other objects and advantages of the present invention will become more apparent as the following description proceeds.

DETAILED DESCRIPTION OF THE INVENTION

In a liquid crystal/polymer composite optical shutter employing one selected from the group consisting of a cholesteric liquid crystal, a chiral smectic liquid crystal and the mixture thereof, the present inventors found that the liquid crystal optical shutter can be operated at low voltages without the delay of response time as well as to be improved in impact resistance by specifying the concentration range of the nematic liquid crystal and, at the same time, introducing a flexible polytetramethylene chain with intermediate sizes into the polymer.

According to the present invention, liquid crystal domains are formed within a cell-like, transparent, thin film of polymer when photopolymerizing prepolymers containing polytetramethylene chains are polymerized under UV light.

To begin with, this description is with regard to the attributes of the liquid crystal used in the liquid crystal/polymer composite optical shutter. It is well known to those skilled in the art that the incorporation of a small quantity of cholesteric liquid crystal into a nematic liquid crystal turns the total system into a cholesteric type liquid crystal.

When no electric field is applied across a liquid crystal/ polymer composite optical shutter employing such cholesteric type liquid crystals, the liquid crystal phase has a structure of focal conic polydomain, a cholesteric liquid crystal's characteristic structure. The introduction of thin walls of transparent polymer, such as cell walls, into such cholesteric type liquid crystals allows much more focal conic domains per volume, leading to remarkable fight scattering, compared with the case of employing only cholesteric liquid, which is of high light scattering. From this effect, contrast ratio in display can be greatly improved.

In addition, an improvement in response time is brought about, as will be described. Rising time ($t_r$) is correspondent to the time necessary to strongly orient the molecules of liquid crystal with an electric field, to which the response property of the nematic liquid crystal, the base liquid crystal including the cholesteric liquid crystal, is related. Due to this fact, it is likely to be shortened with an increase of the applied electric field.

Meanwhile, decaying time ($t_d$) is correspondent to the time necessary for the polydomain structure to recover spontaneously, so that the twisting power of cholesteric liquid crystal and a polymer wall effect are important. Accordingly, it is very efficient to introduce many walls into the liquid crystal phase in order to shorten the decaying time. However, since high concentration of polymer requires high operating voltages (see NHK Kiken, supra), it is necessary to lower the concentration of polymer and treat many liquid crystal interfaces.

In this regard, it is useful to coat the liquid crystal domains with a lower concentration of transparent polymer. In addition, a high concentration of nematic liquid crystal is efficient for the high speed of $t_r$, but weakens the twisting power of the cholesteric liquid crystal, giving rise to increasing the decaying time ($t_d$). Accordingly, it is important to employ a method of introduction which considers the properties of cholesteric liquid crystal, the concentration of nematic liquid crystal and the properties of the polymer wall.

In one aspect of the present invention, there is provided a liquid crystal optical shutter comprising a light-adjusting layer supported between two sheets of transparent substrates, which consists of a polymeric component and liquid crystal components. The liquid crystal optical shutter is operable at relatively low voltages of 3 to 12 V and shows $t_r+t_d$ of 8 to 16 ms and a contrast ratio of at least 120:1 ($T_{max}/T_0$, wherein $T_{max}$ is maximum transmissivity (%) in the presence of electric field, T is transmissivity (%) in the absence of electric field).

The polymeric component used in the liquid crystal optical shutter according to the present invention is based on urethaneacrylates and prepared by photopolymerizing the urethaneacrylates. Preferably, the polymeric component is present in the light-adjusting layer in amounts ranging from approximately 3 to approximately 30% by weight and more preferably from approximately 5 to approximately 15% by weight.

The liquid crystal components used in the liquid crystal optical shutter includes a nematic crystal as a base liquid crystal. This nematic crystal is present in an amount of approximately 90 to approximately 99.99% by weight.

Besides the nematic liquid crystal, other liquid crystals may be used in accordance with the present invention. Preferred are those which can be compatible with the nematic liquid crystal and afford sufficient helical twisting power to the nematic liquid crystal. Specifically, those that can show a cholesteric phase or a chiral smectic C phase at room temperature or their working temperatures are preferred. Alternatively, a mixture of cholesteric liquid crystal and chiral smectic C liquid crystal may be used.

With regard to the composition of the liquid crystals, a mixture of cholesteric liquid crystal and chiral smectic C liquid crystal is likely to lower the operating voltage and to shorten the response time. This effect is believed to be attributed to the incorporation of chiral smectic C liquid crystal (strong dielectric liquid crystal) which not only amplifies the spatial sway of polarizability anisotropy to increase the light scattering (to converge transmissivity $T_0$ into 0), but responds to the applied electric field so quickly as to promote the collapse of the twisted structure, similar to cholesteric liquid (that is, to diminish $t_r$).

Anything may be used as the substrate in the liquid crystal optical shutter of the present invention, if it is conductive and transparent, for example glass, transparent resin, and the like.

In order to use the nematic liquid crystal as a base liquid crystal incorporating other liquid crystals, it must satisfy the following requirements: It must have an adequate response to electric field at room temperature; it is required that the nematic liquid crystal has to remain in its own phase when they are mixed and photopolymerized; and, the nematic liquid crystal needs to be easily filled into cells consisting of the polymer between two sheets of the substrates. Suitable are general nematic liquid crystals, such as E8 (trade name, commercially available from Merck Company), biphenyls, biphenylcyclohexanes, cyclohexylcyclohexanes, cyanophenylcyclohexanes, cyanocyclohexylcyclohexanes, BL-036 (trade name, commercially available from Merck Company), TL-202 (containing fluorides, trade name, commercially available from Merck Company) and mixtures thereof.

As to the amount of the liquid crystals, the nematic liquid crystal is, as mentioned previously, present in an amount of approximately 90 to 99.99% by weight based on the total weight of the liquid crystal components used, and more preferably, from approximately 96.0 to approximately 99.91% by weight, taking into consideration operating voltage and response time. In the mixture of cholesteric liquid crystal and chiral smectic C liquid crystal, either of the two is preferably, if not specified, present in amounts ranging from approximately 40 to approximately 60% by weight.

The polymer used in the present invention consists of 20 to 60% by weight of urethane acrylates obtained from polytetramethylene glycol (hereinafter referred to as "PTMG") having an average molecular weight ($M_w$) of 1,000 or 2,000, and 80 to 40% by weight of a mixture of the monomers or dimers of trimethanol propanetriacrylate with at least one species selected from the group consisting of hydroxyethylacrylate, phenoxyethylacrylate, and 1,6-hexanedioldiacrylate.

The urethaneacrylate can be obtained by attaching a toluenediisocyanate (hereinafter referred to as "TDI") to the terminus of PTMG and carrying out a reaction yielding hydroxyethylacrylate as a terminal group of the resulting PTMG. It can be used in conjunction with the amount of monofunctional monomer and multifunctional monomer, so as to control the flexibility of the polymer main chain produced, the mobility of segment, and the elasticity of the polymer.

In this connection, the amount of monomer or dimer incorporated is to be suitably controlled with relation to the liquid crystal components used. Refractive index and elasticity of the polymer photopolymerized are primary factors in controlling of the amount of the dimer or monomer. That is, it is preferable that the refractive index is the same as, or in the proximity of the ordinary refractive index of the liquid crystal oriented with an electric field. The elasticity of the photopolymerized polymer is preferably on the order of approximately $8 \times 10^9$ to approximately $3 \times 10^8$ dyne/cm$^2$ and, more preferably, from approximately $6 \times 10^9$ to approximately $8 \times 10^8$ dyne/cm$^2$.

Within such elasticity range, the polymer is formed into a structure of cell walls encapsulating the liquid crystal domains properly during preparation of the liquid crystal/polymer composite film.

Additives may be used in the liquid crystal optical shutter of the present invention, including a polymerization initiator, such as 1-hydroxycyclohexylphenylketone, a chain transfer agent, dye and the like. These additives can be properly utilized according to the properties of the liquid crystal and polymeric component or the kind and purpose of the display finally produced.

Described below is a process for preparing the liquid crystal optical shutter of the present invention.

First, the nematic liquid crystal, the base liquid crystal, is mixed well with the cholesteric liquid crystal. At this time, materials for the liquid crystals may be those that have characteristic turbidity or are in the state of isotropy.

The prepolymers and the additives are added to the mixture and stirred sufficiently. The resulting mixture is clear prior to photopolymerization. It is inserted between two sheets of transparent conductive substrates of which the gap size is controlled by a spacer.

Then, the exposure of the mixture supported between the sheets to an ultraviolet light polymerizes the polymeric components to form cell walls and liquid crystal domains. Consequently, a light-adjusting layer is formed.

Although not specified, the thickness of the light-adjusting layer is preferably on the order of approximately 5 to approximately 60 μm based on response time, and more preferably from approximately 6 to approximately 14 μm.

The liquid crystal optical shutter according to the present invention has superior performance, showing an operating voltage of 4 to 8 V, a rising time ($t_r$) of 4 to 13 ms and a decaying time ($t_d$) of 4 to 13 ms and that, at an operating voltage of 6 V, transmissivity is at least 90% and maximum contrast ratio ($T_{max}/T_0$) is at least 120:1.

Compared with conventional polymer/liquid crystal composite optical shutters requiring an operating voltage of several tens of voltages, the optical shutter according to the present invention is remarkably improved in requiring lower operating voltage. In addition, compared with the maximum contrast ratios ranging from 2:1 to 14:1 obtained by employing only nematic liquid crystals, the optical shutter according to the present invention is much enhanced, so that it can provide practical liquid crystal displays with high performance.

The preferred embodiment of the present invention will now be further described with reference to specific examples.

In the following examples and comparative examples, each of the display devices prepared was measured for its electro-optical properties with Function Generator 1930A (trade name, commercially available from NF company) as a power source and a 150 W (100 V) halogen lamp as a light source.

Luminous flux with a diameter of 2 mm, which was obtained with a lamp house for the halogen lamp and a white filter for a microscope, was projected into a sample which was 30 cm distant from the filter. The luminous flux penetrating through the sample was directed to a slit system with a width of 2 mm which was 10 cm from the sample, and the luminous flux through the slit system was detected by a photodetector.

Under these conditions, a maximum contrast ratio was calculated by obtaining the ratio of maximum transmissivity ($T_{max}$) in the presence of an electric field to a transmissivity ($T_0$) in the absence of an electric field.

To measure the rising and decaying time, rectangular wave having a frequency of 500 Hz was applied using a digital storage oscilloscope (400 MHz, commercially available from Iwatsu Company, Ltd.).

In the following examples, term "polymeric component A" is a mixture wherein the weight ratio of PTMG ($M_w$=2,000):phenoxyethylacrylate: 1,6-hexanediolacrylate:trimethylolpropanetriacrylate is 50:20:10:20, while the term "polymeric component B" denotes a mixture wherein the weight ratio of PTMG ($M_w$=1,000): phenoxyethylacrylate:trimethylolpropanetriacrylate is 60:20:20.

EXAMPLE 1

9.6% by weight of polymeric component A and liquid crystal components consisting of 88.0% by weight of 5-CB (trade name, commercially available from Merck Company), 2.1% by weight of E-8 (trade name, commercially available from Merck Company) and 0.3% by weight of C-5 (trade name, commercially available from Merck Company) were mixed well and inserted between two sheets of indium tin oxide glass substrates which had been set 7.0 μm apart from each other by a spacer.

The sheets were placed at a point 25 cm apart from the lens of a light source, a high pressure 150 W mercury lamp, and exposed to a luminous flux of ultra-violet from the light source at 22° C. for 5 minutes, so as to cure the polymeric component.

When observing the organization of the resulting photopolymerized composition by means of a scanning electron microscope, droplets of liquid crystal were encapsulated within thin polymeric films. Also, it was observed that the cholesteric-type liquid crystals were formed into a polydomain focal conic structure in each droplet.

The electro-optical properties of the display device prepared were measured at 20° C. The results of the measurement were as follows: maximum contrast ratio ($T_{max}/T_0$)= not less than 120:1 at an operating voltage of 10 V; $t_r$=6.1 ms, $t_d$=8.0 ms; and optical transmissivity=90% at an operating voltage of 6 V.

EXAMPLE 2

9.0% by weight of polymeric component B, and liquid crystal components consisting of 87.0% by weight of 5-CB (trade name, commercially available from Merck Company), 2.0% by weight of E-8 (trade name, commercially available from Merck Company), 1.5% by weight of cholesteric chloride and 0.5% by weight of ZLI 4654 (trade name, commercially available from Merck Company) were mixed well and inserted between two sheets of indium tin oxide glass substrates which had been set 7.0 μm apart from each other by a spacer.

These sheets were placed at a point 25 cm apart from the lens of a light source, a high pressure 150W mercury lamp, and exposed to the light source at 22° C. for 5 minutes, so as to cure the polymer.

When observing the organization of the resulting photopolymerized composition by means of a polarization microscope, it was recognized that droplets of liquid crystal were encapsulated within thin polymeric films. Also, it was observed that each droplet had a size of from several to 10 μm and formed into a polydomain focal conic structure.

The electro-optical properties of the optical shutter prepared were measure at 20° C. The results of the measurement were as follows: maximum contrast ratio $(T_{max}/T_0)=$ not less than 130:1 at an operating voltage of 10 V; response time $(t_r+t_d)=15.0$ ms; and optical transmissivity=90% at an operating voltage of 6 V.

EXAMPLE 3

15.0% by weight of polymeric component A, and liquid crystal components consisting of 82.0% by weight of 5-CB (trade name, commercially available from Merck Company), 2.5% by weight of E-8 (trade name, commercially available from Merck Company), 0.25% by weight of C-5 (trade name, commercially available from Merck Company) and 0.25% by weight of ZLI 4654 (trade name, commercially available from Merck Company) were mixed well and inserted between two sheets of indium tin oxide glass substrates which had been set 7.0 μm apart from each other by a spacer.

These sheets were placed at a point 25 cm apart from the lens of a light source, a high pressure 150W mercury lamp, and exposed to a luminous flux of ultraviolet from the light source at 22° C. for 5 minutes, so as to cure the polymeric component.

When observing the organization of the resulting photopolymerized composition by means of a scanning electron microscope, it was recognized that droplets of liquid crystal were encapsulated within thin polymeric films. Also, it was observed that the cholesteric-type liquid crystals were formed into a polydomain focal conic structure in each droplet.

The electro-optical properties of the display device prepared were measured at 20° C. The results of the measurement were as follows: maximum contrast ratio $(T_{max}/T_0)=$ not less than 120:1 at an operating voltage of 13 V, $t_r=3.1$ ms, $t_d=8.0$ ms; and optical transmissivity=75% at an operating voltage of 10 V.

Comparative Example 1

40% by weight of polymeric component B, and liquid crystal components consisting of 57.38% by weight of 5-CB (trade name, commercially available from Merck Company), 1.3% by weight of E-8 (trade name, commercially available from Merck Company), 0.99% by weight of cholesteric chloride and 0.33% by weight of ZLI 4654 (trade name, commercially available from Merck Company) were mixed well and inserted between two sheets of indium tin oxide glass substrates which had been set 7.0 μm part from each other by a spacer.

These sheets were placed at a point 25 cm apart from the lens of a light source, a high pressure 150 W mercury lamp, and exposed to a luminous flux of ultra violet from the light source at 22° C. for 5 minutes, so as to cure the polymeric component.

The electro-optical properties of the light-adjusting layer formed between the sheets were measured at an operating voltage of 6 V: maximum contrast ratio $(T_{max}/T_0)=$about 16:1; response time $(t_r+t_d)=22.0$ ms.

From these results, it is apparent that the excess amount of the polymeric component B increases operating voltage and lowers contrast ratio.

Comparative Example 2

9.0% by weight of methacrylate-based prepolymer containing a polyesteric oligomer, and liquid crystal components consisting of 87% by weight of 5-CB (trade name, commercially available from Merck Company), 2.0% by weight of E-8 (trade name, commercially available from Merck Company), 1.5% by weight of cholesteric chloride and 0.5% by weight of ZLI 4654 (trade name, commercially available from Merck Company) were mixed well and inserted between two sheets of indium tin oxide glass substrates which had been set 7.0 μm apart from each other by a spacer.

These sheets were placed at a point 25 cm apart from the lens of a light source, a high pressure 150 W mercury lamp, and exposed to a luminous flux of ultra violet from the light source at 22° C. for 5 minutes, so as to cure the polymeric component.

At room temperature and at an operating voltage of 6 V, the electro-optical properties of the display device prepared were measured and the results are as follows: maximum contrast ratio $(T_{max}/T_0)=$about 20:1; $t_r=8$ ms, $t_d=26$ ms, and transmissivity=60%.

From these results, it is recognized that the prepolymer devoid of urethaneacrylate lowers the transmissity and contrast ratio.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A liquid crystal optical shutter comprising two sheets of transparent, conductive substrates and a fight-adjusting layer supported between the sheets, wherein said light-adjusting layer comprises:

(a) a transparent, thin film of polymer prepared by photopolymerizing prepolymers comprising urethaneacrylates; and (b) a liquid crystal component selected from the group consisting of a cholesteric liquid crystal, a chiral smectic liquid crystal, and a mixture thereof, being encapsulated with said thin film of polymer.

2. The liquid crystal optical shutter, according to claim 1, wherein said urethane acrylates are present in an amount of approximately 20 to approximately 60% by weight, based on the total weight of the polymer.

3. The liquid crystal optical shutter, according to claim 1, wherein said prepolymers comprising urethane acrylates comprises at least one species selected from the group consisting of hydroxyethylacrylate, phenoxyethylacrylate, 1,6-hexanediolacrylate, and trimethylolpropanetriacrylate.

4. The liquid crystal optical shutter, according to claim 1, wherein said prepolymers containing urethane acrylates are present in an amount of approximately 3 to approximately 30% by weight, based on the total weight of the light-adjusting layer.

5. The liquid crystal optical shutter, according to claim 1, wherein said prepolymer comprises polytetramethyleneglycol having a weight average molecular weight of 1,000 or 2,000.

* * * * *

UNITED STATES PATENT AND TRADEMARK OFFICE
CERTIFICATE OF CORRECTION

PATENT NO. : 5,455,083
DATED : October 3, 1995
INVENTOR(S) : Chang H. Noh, et. al.

It is certified that error appears in the above-indentified patent and that said Letters Patent is hereby corrected as shown below:

Column 2: line 65: "an" should read --art--.
Column 3: line 8: "fight" should read --light--; line 47: "T is" should read --$T_0$ is--.
Column 8: line 39: "transmissity" should read --transmissivity--; line 53: "fight-adjusting" should read --light-adjusting--.

Signed and Sealed this

Thirtieth Day of January, 1996

Attest:

BRUCE LEHMAN

Attesting Officer    Commissioner of Patents and Trademarks

Disclaimer

5,455,083—Chang H. Noh, Suwon, Rep. of Korea; T. Asada, Kyoto, Japan. LIQUID CRYSTAL OPTICAL SHUTTER. Patent dated October 3, 1995. Disclaimer filed November 17, 2003 by the assignee, Samsung Electron Devices Co., Ltd.

Hereby enter this disclaimer to claims 1-5 of said patent.

*(Official Gazette, June 15, 2004)*